United States Patent [19]

Bohne et al.

[11] Patent Number: 4,596,846

[45] Date of Patent: Jun. 24, 1986

[54] MECHANICALLY ERASABLE PRINTING LIQUID

[75] Inventors: Karl-Heinz Bohne, Iserhagen; Hans-Jürgen Rahn, Hanover, both of Fed. Rep. of Germany

[73] Assignee: Pelikan Aktiengesellschaft, Hanover, Fed. Rep. of Germany

[21] Appl. No.: 523,726

[22] Filed: Aug. 16, 1983

[30] Foreign Application Priority Data

Aug. 16, 1982 [DE] Fed. Rep. of Germany ....... 3230463

[51] Int. Cl.$^4$ ............................ C08K 5/21; C08K 5/10
[52] U.S. Cl. .................................... 524/173; 524/210; 524/211; 524/215; 524/242
[58] Field of Search ............... 524/173, 215, 210, 159, 524/242, 211; 523/161; 106/22

[56] References Cited

U.S. PATENT DOCUMENTS

| | | | |
|---|---|---|---|
| 4,163,675 | 8/1979 | Hirano et al. | 524/159 |
| 4,297,260 | 10/1981 | Ferree et al. | 523/161 |
| 4,349,639 | 9/1982 | Muller | 106/22 |
| 4,460,727 | 7/1984 | Shoji | 524/215 |

FOREIGN PATENT DOCUMENTS

| | | | |
|---|---|---|---|
| 2914913 | 10/1980 | Fed. Rep. of Germany . | |
| 3041769 | 5/1981 | Fed. Rep. of Germany . | |
| 49-45334 | 12/1974 | Japan | 524/159 |
| 55-139471 | 10/1980 | Japan . | |
| 57-135878 | 8/1982 | Japan | 523/161 |

*Primary Examiner*—Lewis T. Jacobs
*Attorney, Agent, or Firm*—Karl F. Ross; Herbert Dubno

[57] ABSTRACT

A printing ink for capillary or jet printers adapted to form a mechanically erasable image, comprises a latex-based aqueous polymer dispersion including a water-soluble or organic-solvent soluble dyestuff coloring the particles of the dispersion without the use of additional solvent.

4 Claims, No Drawings

MECHANICALLY ERASABLE PRINTING LIQUID

FIELD OF THE INVENTION

Our present invention relates to a mechanically erasable printing fluid and more particularly to an ink which can be applied to a printing medium, e.g. paper, and can be removed therefrom by mechanical means. Most specifically the invention relates to a liquid which can be used in so-called jet or capillary-tube printers and which nevertheless generates a mechanically erasable trace upon the substrate.

BACKGROUND OF THE INVENTION

It is frequently desirable to produce print images from a printing liquid or ink which can be readily removed or corrected. Such printing liquids generally comprise a coloring agent or pigment and a liquid carrier or binder in which the pigment is dispersed One of the problems with such printing liquids is that many of them tend to penetrate extremely rapidly into a bibulous or other substrate which does not have a closed surface so that the removal of the printing trace or image by mechanical means may not be possible at all or is rendered so difficult that the medium or carrier is frequently destroyed by the erasing process.

The mechanical erasure of such traces can be improved by providing the solvent with an interference factor which reduces the penetration into the substrate. Such solvents, however, create other problems which have precluded their widespread use.

Obviously it has long been desirable to utilize printing liquids for the purposes described which are water based, i.e. wherein the dispersion is a dispersion of the pigment and any binder in a vehicle consisting permanently or exclusively of water.

In German patent document (open application) DE-OS No. 29 14 913, for example, a water-based printing liquid is described which consists of an aqueous latex dispersion in which a pigment preparation in the form of a fine paste is dispersed and which contains additional substances such as preservatives. Because such liquids are not sufficiently flowable, i.e. are comparatively viscous, they cannot be utilized in so-called capillary or jet printers in which the liquid is projected upon the printing medium.

German patent document (Offenlegungsschrift) DE-OS No. 30 41 769, moreover describes an erasable printing medium which consists of a latex emulsion of a carboxylated styrene-butadiene copolymer of a predetermined viscosity and surface tension in water together with a water soluble dyestuff selected from the group which consists of triarylmethane dyestuffs soluble in the emulsion.

The problem with such printing fluids is that they tend to be extremely unstable in the presence of light and to fade even after a short time. They thus cannot be used for permanent printing purposes and the field of use is therefore extremely limited.

OBJECTS OF THE INVENTION

It is, therefore, an object of this invention to provide a printing fluid or ink, especially for high-speed jet and capillary printers and high-speed printing machines utilizing same, whereby the additives of prior art systems are avoided.

Still another object of this invention is to provide a water-based printing liquid which can be readily removed or erased by mechanical means, for example, erasing rubbers, without damaging the printing support but which will nevertheless yield a practically permanent, intensive, nonfading print.

Still another object of this invention is to provide a printing ink especially for use in capillary or jet printers which can be easily erased but which will yield a long-lived, intense and nonfading image.

SUMMARY OF THE INVENTION

These objects and others which will become apparent hereinafter are attained, in accordance with the present invention, in a printing liquid or ink for capillary and jet printers which comprises an aqueous latex-paste binder dispersion in which a water-insoluble and/or a solvent-soluble dyestuff is incorporated.

The term "solvent-soluble" is here used to refer to solubility in nonaqueous and indeed even hydrophobic solvents, generally organic compounds such as the hydrocarbons and chlorinated hydrocarbons. Thus a solvent-soluble dyestuff is one which is soluble in hydrocarbon and chlorinated hydrocarbon solvents such as as the solvents of this group containing from 1 to 10 carbon atoms and in a straight-chain, branched or cyclic configuration, saturated or unsaturated.

According to a feature of the invention, the aqueous binder dispersion is preferably an aqueous polymer dispersion of noncarboxylated styrene-butadiene copolymer, of 2-chlorobutadiene polymer, or of a vinyl-pyridine-styrene-butadiene terpolymer.

The water insoluble and/or solvent-soluble dyestuffs of the invention are preferably anthraquinone dyestuffs and most preferably are selected from the group which consists of Ceresblue R and Waxoline blue APFW (CI-61,500 and CI-61,551). Dyestuffs of the triarylmethane aqueous, preferably Reflexblue RCI #42770:1, also can be used.

Printing inks of this type, because they contain an aqueous binder dispersion with a latex base appear to retain the coloring agent in the latex layer which lies on the surface of the substrate after the ink has been applied in a form which enables the layer and thus the color to be extremely easily removed by a conventional rubber eraser without damaging the substrate surface. Typing over with the same ink is not impeded, and indeed the type-over color and resolution is in no way diminished or adversely affected.

The ink of the invention dries in a permanent, i.e. water insoluble, form, as soon as the dispersion water evaporates and after some time the layer can no longer be readily erased although it does not appear to suffer discoloration with aging. In other words, while correction is possible in a simple and effective manner as soon as the layer dries, with the passage of time the permanence of the print is such that erasure is impeded.

While the dyestuff is not water soluble and the composition does not contain any solvent for the dyestuff in the form in which soluble dyestuffs are generally provided, it appears that the binder particles do in part solubilize the dyestuff so that the dyestuff acts as a coloring agent for the dry binder particles and the binder particles on the surface of the substrate are themselves colored by the dyestuff.

The color intensity of the polymer particles can be enhanced noticeably by the use in the composition of color carriers or dissolution enhancers or promoters.

Compounds of the latter class include ureas, acid amides and sulfoxides.

The preferred urea compounds are N-methylurea, thiourea and 2-hydroxyethylurea. The preferred acid amides are formamide and acetamide and the most effective sulfoxide appears to be dimethylsulfoxide. These agents can be used individually or in combination.

Further intensification of the coloring of the binder particles can be achieved by the addition of small quantities of plasticizers for the binder. Such plasticizers are preferably phthalic acid esters and citric acid esters. Best results are obtained with di-isobutylphthalate from the class of phthalic acid esters, and with acetyltributylcitrate from the group of citric acid esters.

An important aspect of the ink of the invention is that it does not dry or harden excessively quickly in the capillaries or nozzles of the printing head, or elsewhere if a static condition remains for a long period of time. The "pot life" or drying time can be increased by adding to the composition a moisture retainer, i.e. a compound which prevents premature drying. Such agents include glycerin, 1,2,4-butanetriol and mixtures of glycerin and karion (sorbitol).

The liquid of the invention can be adjusted as to viscosity and surface tension with the aid of surfactants such as the fatty acid ethoxylates. A preferred compound of this class is the polyglycol-400-monolaurate which can be used alone or together with an acylsarcosinate, preferably Na-N-lauroylsarcosinate, which can also be utilized alone.

Aside from stabilizing the ink without impeding mechanical erasure in the manner described, these surfactants allow the requisite viscosity and adhesion to the substrate to be generated.

Preferably, in addition to the dyestuff, the ink contains 1 to 2% by weight of the fine-paste pigment preparation described in German open application No. 29 14 913. This preparation appears to increase the light fastness and resistance to fading of the ink.

The ink of the invention is produced as follows:

Initially the latex based aqueous polymer dispersion, for example of the styrene-butadiene, 2-chlorobutadiene or vinylpyridine-styrene-butadiene type (preferably a mixture of all three types) is formed. The dyestuff from the anthraquinone and/or triarylmethane groups is thus introduced until the particles of the dispersion have been colored to the desired intensity. Together with the dyestuff we can add the color carrier, plasticizer or solubility promoter or all three or any one of them can previously have been provided in the polymer dispersion. Any other additives can then be mixed with the composition and the viscosity and flowability or other rheological characteristics can then be shaped by the addition of water and/or the surfactant. The dyestuff is added in dry, finely divided form in the preferred mode of carrying out the invention.

The combination can then consist of 50 to 90% by weight of the aqueous binder dispersion containing 25% by weight of the binder particles (dry) 2 to 4% by weight of the water-insoluble or solvent-soluble dyestuff, 5 to 12% by weight of solubility promoters, 2 to 5% by weight of plasticizers, 5 to 20% by weight of moisture retentive agents, 0.1 to 2.0% by weight of surfactant and up to 2% (preferably 1 to 2%) by weight of the pigment fine-paste preparation.

SPECIFIC EXAMPLE

An aqueous latex dispersion consisting of 10% dry weight of styrene-butadiene, 5% dry weight of poly-2-chlorobutadiene and 10% dry weight vinylpyridine-styrene-butadiene terpolymer is prepared.

To this latex paste dispersion, in an amount which will form 7% by weight of the printing ink, the remaining components are added.

The water insoluble dyestuff (2% Ceresblue R and 2% Reflexblue RCI #42770:1) in terms of the total composition is then added together with the following solubility promoters:

2-hydroxyethylurea (3% by weight of the total composition), acetamide (3% by weight of the total composition) and dimethylsulfoxide (3% by weight of the total composition).

The mixture is blended and the following plasticizers are added:

di-isobutylphthalate (1.5% by weight of the total composition) acetyltributylcitrate (1.5% by weight of the total composition.

1.5% by weight of the total composition in the form of the fine paste pigment of the aforementioned German publication is then added and blended into the composition and the wetting agent supplied to make up 1% by weight of the total composition was a mixture of equal parts of polyglycol-400-monolaurate and the sodium-N-lauroylsarcosinate. 11.5% of a mixture of equal parts of glycerin, 1,2,4-butanetriol and sorbitol, in equal parts by weight was then added.

The product formed a highly flowable intense ink which was used effectively in a jet or capillary printer to provide a print which, immediately upon application to the paper substrate and evaporation of water, dried to form a readily erasable print. With time, the mechanical erasability of the print diminished although no fading was noted.

We claim:

1. A printing ink for producing mechanically erasable images, consisting essentially of:
    an aqueous latex-based binder dispersion of at least one polymer selected from the group consisting of noncarboxylated styrene-butadiene, 2-chlorobutadiene and vinylpyridine-styrene-butadiene;
    a water insoluble or organic-solvent soluble dyestuff coloring polymer particles thereof and selected from the group consisting of CI 61,500, CI 61,551 and CI 42770:1;
    at least one solubility promoter selected from the group consisting of N-methylurea, thiourea, 2-hydroxy-ethylurea, formamide, acetamide and dimethylsulfoxide; and
    at least one moisture-retentive compound selected from the group consisting of glycerine, 1,2,4-butanetriol and sorbitol.

2. The printing ink defined in claim 1 wherein said dispersion further includes at least one phthalic acid ester.

3. The printing ink defined in claim 2 wherein said phthalic acid ester is di-isobutylphthalate.

4. The printing ink defined in claim 1 wherein said dispersion further includes acetyltributylcitrate as plasticizer.

* * * * *